Dec. 3, 1968 W. HACKENBERG 3,414,678

CIRCUIT FOR TESTING THE COMPLETENESS OF CONNECTIONS BETWEEN ELEMENTS IN A TELEPHONE SYSTEM PRIOR TO SIGNALLING

Filed July 15, 1965 2 Sheets-Sheet 1

Dec. 3, 1968 W. HACKENBERG 3,414,678

CIRCUIT FOR TESTING THE COMPLETENESS OF CONNECTIONS BETWEEN ELEMENTS IN A TELEPHONE SYSTEM PRIOR TO SIGNALLING

Filed July 15, 1965 2 Sheets-Sheet 2

United States Patent Office
3,414,678
Patented Dec. 3, 1968

3,414,678

CIRCUIT FOR TESTING THE COMPLETENESS OF CONNECTIONS BETWEEN ELEMENTS IN A TELEPHONE SYSTEM PRIOR TO SIGNALLING

Walter Hackenberg, Hirschlanden, Germany, assignor to International Standard Electric Corporation, New York, N.Y., a corporation of Delaware Filed July 15, 1965, Ser. No. 472,116
Claims priority, application Germany, July 25, 1964, St 22,459
6 Claims. (Cl. 179—18)

ABSTRACT OF THE DISCLOSURE

A system is provided for checking connections between control facilities in a telephone system. For example, it may be desirable to check connections between a register and a marker which are temporarily interconnected. To make the check, or test, a potential is applied to all the signal wires at the transmitting end. Transmission is enabled only when a definite potential is received through a test circuit, including a gate circuit, from the signal wires at the receiving end.

Figure 1:
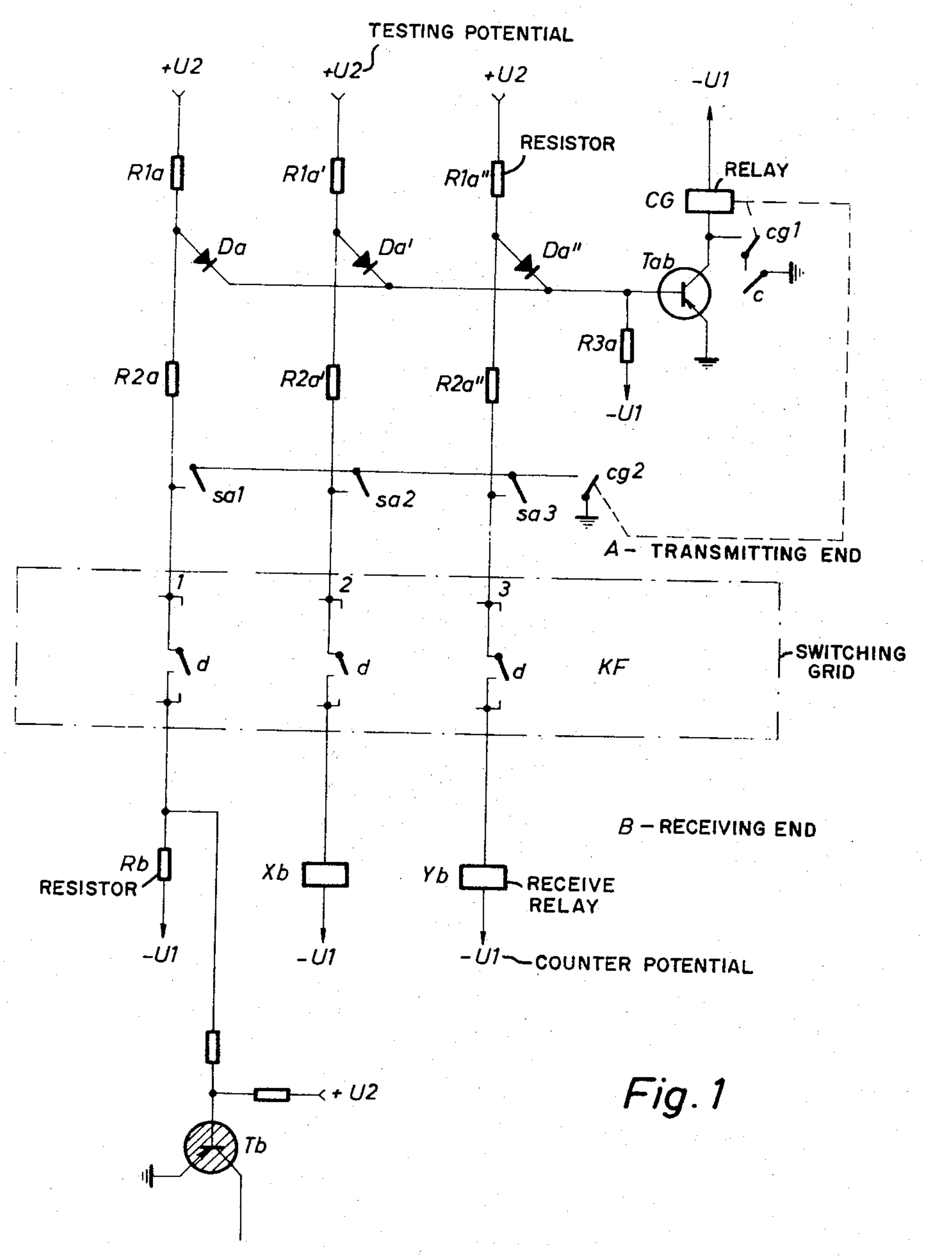

The invention relates to arrangements for testing the completeness of circuits before signalling via a signalling group connected between centrally arranged control facilities. It has special utility in a telecommunication system and particularly in a telephone exchange system.

When a connection is about to be established in a telecommunications exchange system, the various equipments within the system exchange a plurality of information items. Therefore, it is necessary to have a transmission method as reliable as possible. This requirement can easily be met, if the information items are represented in a checkable code, which, however, presumes the regular application of the information items at defined times. Such codes can be checked by electronic testing circuits in short periods of time.

The transmission methods known to the art are generally insufficient when signals are not regularly applied and they must be transmitted through combined signal groups.

Code checking frequently becomes impossible, if the information items are represented in the binary code.

A binary code is preferred when multi-digit dial information items are transmitted through a multi-wire signalling group in parallel. Information transmission between a register and a marker in a telephone exchange is only mentioned by way of example. A register is connected with a marker for a short time via a switching grid.

It is an object of the invention to provide a signalling method and means for such a temporary connection of signal groups between the central control facilities of a telecommunication exchange system. Such an arrangement provides reliable signal transmission and through connections and proper operation of the signal conductors. It provides, as well, for reception of the signal on the receive end and for automatically checking the signal. Signalling according to the invention is characterized in that always at the originating end, or terminals, a check potential is applied to all channels or all signal wires of a group. The transmitting facilities then become effective only when a counter potential of a defined magnitude is found on all signal wires. The counter potential is applied to the receiving facilities via the testing device through the connected signal wires.

It is thereby secured that signalling is started only then, when:

(1) All signal channels or wires are through-connected,
(2) A receiver is connected to all signal wires at the distant end, and
(3) The signal wires conduct no external potential or show inadmissible leakages.

A suitable embodiment of the signalling method according to the invention for alternate signalling is characterized in this that a separate signal group is used for each transmission direction. The counter potential on one signal wire of a transmission direction depends on the through-connection of both signal wires of the other transmission direction. By this measure both signal groups are suitably checked, before the transmitting end starts to transmit the information. Such checking is suitably selected then, when an originating point starts to transmit the information. Frequently it also occurs that in two connected facilities a sort of twin-directed information transmission takes place. Where an information is applied there the transmission commences. For such signal groups, connected if required, the method according to the invention provides that simultaneously, when the check potentials are applied in the originating station to the outgoing signal group, the counter potentials are disconnected from the receiving facilities at the terminating signal group. When the counter potential at the receiving facilities of the terminating signal group is switched off it is secured that the distant end cannot commence signalling. A further embodiment of the signalling method according to the invention is characterized in this that with the seizing of both devices connected to exchange signals timing circuits are connected, and that through these circuits a fault alarm is given, if within a predetermined time the successful connection and, consequently, the readiness to transmit the signals has not been registered. Faulty connections can quickly be investigated and an unnecessary seizing of the central control devices is avoided. Through suitable registering devices the faulty connection can be registered and the central control devices can be released again.

The testing device according to the invention is characterized in this that the test potentials are applied to the signal wires through high-ohmic resistors, and that the receiving facilities are thereby not energized.

The supply resistors for the check potential form, together with the counter potential of the receiver, a voltage divider. All these voltage dividers control an AND-circuit which responds only then when all tapping points of said voltage divider have the same potential.

Figure 2:
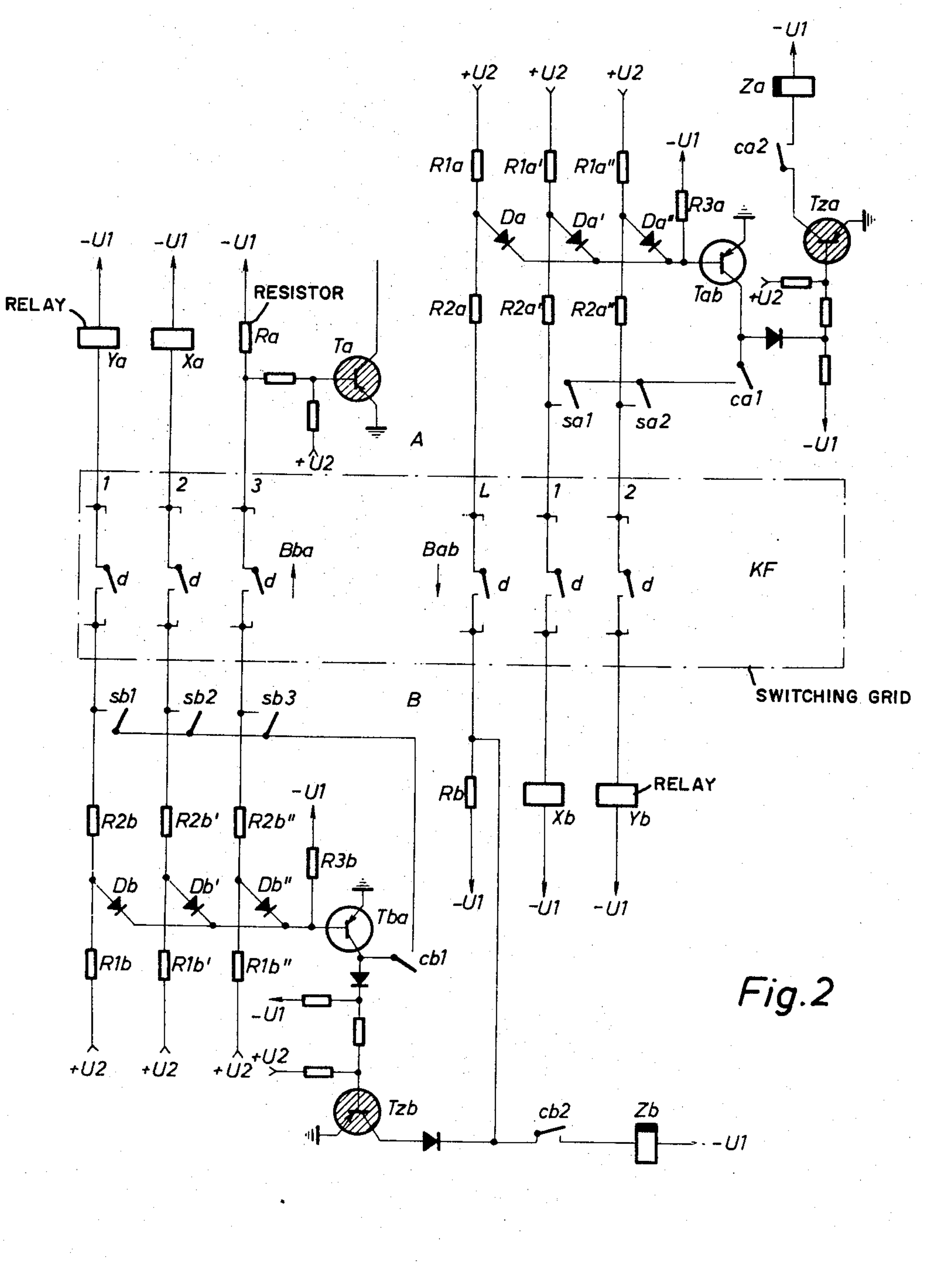

The invention is now in detail explained with reference to examples shown on the accompanying drawings, wherein:

FIG. 1 represents a one-way signal transmission according to the method of the invention, and FIG. 2 shows a two-way signal transmission whereby one station has the privilege over the other.

In FIG. 1 the point A is connected with B via the switching grid KF, when the signal wires 1, 2 and 3 are connected through contacts *d*. A represents the originating or transmitting end and B the receiving end. In A a checking or testing potential +U2 is applied to each signal wire. The supply resistors R1*a*, R2*a*, R1*a'*, R2*a'*, R1*a''* and R2*a''* are of high resistance and are selected so that the receivers at B will not be able to respond immediately to applied signals. A resistor R*b* of a transistor control circuit T*b* is connected to the signal wire 1. As long as said signal wire 1 has not been through-connected the transistor T*b* is conductive. The receive relays X*b* and Y*b* are connected to the wires 2 and 3, but these relays do not respond immediately to the potential +U2 because of the high resistance of the supply resistors at A. All three receivers at B are connected with counter potential —U1. Between the resistors R1*a* and R2*a*, R1*a'* and R2*a'*, as well as between R1*a''* and R2*a''* an AND-circuit is connected. The AND-circuit includes the diodes D*a*, D*a'*, D*a''*, the resistor R3*a* and the transistor T*ab*. All of the diodes D*a*, D*a'*, D*a''* are conductive so long as the wires 1, 2 and 3 are not through-connected.

As a consequence of the continued operation of the AND gate, the transistor T*ab* receives blocking voltage and remains non-conductive. As soon, however, as a signal wire 1, 2 or 3 is through-connected and conducts the counter potential —U1, the particular diode connected to said signal wire becomes non-conductive. Only when all signal wires are through-connected and conduct the counter potential —U1 in a defined magnitude will all diodes of the AND-circuit become non-conductive and release the control potential —U1 at the resistor R3*a*, thus rendering the transistor T*ab* conductive. By proper dimensioning of the resistors R1*a*, R2*a* and the receive-end resistor R*b*, a simple test or measurement of the effects of the signal wire on external voltage or leakages may be made. The associated diode is not rendered non-conductive in these cases of trouble, so that transistor T*ab* remains blocked. When the transistor T*ab* is conductive, i.e. when all signal wires 1, 2 and 3 are ready for signal transmission, relay CG operates and releases through its contact *cg*2 the signal transmitting contacts *sa*1, *sa*2, and *sa*3. These contacts apply ground potential to the signal wires, depending on the information to be transmitted. Thereupon, the receivers of the distant end B respond. Ground potential applied over S*a*1 causes a change in the base potential at T*b* which renders the transistor T*b* non-conductive. When A is seized, a contact *c* of a seizing relay not shown on the drawing, is closed. After relay CG has been energized, the holding circuit for said relay is closed via contact *cg*1, so that the condition of the testing transistor T*ab* is quite unimportant while the signals are transmitted.

FIG. 2 shows the same testing arrangement for both signal groups B*ab* and B*ba*. In A the testing transistor T*ab* is provided, which is controlled by the AND-circuit, consisting of the diodes D*a*, D*a'*, D*a''*, and the resistor R3*a*. In B the testing transistor T*ba* is provided, which is controlled by the AND-circuit, consisting of the diodes D*b*, D*b'*, D*b''*, and the resistor R3*b*. Both transistors T*ab* and T*ba* apply, in conductive condition, ground potential to the contacts *sa*1, *sa*2, and *sb*2, *sb*1, *sb*3, respectively. The contacts *ca*1 and *ca*2 of a seizing relay, not shown on the drawing, are closed at A when the circuit is seized. Through contact *ca*2 a timing circuit Z*a* is started. When transistor T*za* remains conductive, i.e. when the transistor T*ab* does not signal "signal wires in proper condition," a fault report is initiated by the timing circuit Z*a*. Similar conditions prevail at B. With the seizing process the contacts *cb*1 and *cb*2 are closed. The timing circuit Z*b* is connected. During said period the transistor T*ba* becomes conductive and the transistor T*zb* is non-conductive, if all signal wires of the signal group B*ba* are in proper condition. As already mentioned above the transistor T*ba* becomes conductive when all diodes D*b*, D*b'*, D*b''* are blocked by the counter potential —U1 of the distant station A. The signal group B*ab* now has a separate control line L. Counter potential —U1 is kept off the line L in B via the conductive transistor T*zb*, till the transistor T*ba* becomes conductive, i.e. the signal group B*ba* is in proper condition. Only then the transistor T*ab* can become conductive at A, because through the counter potential —U1, applied to the control lead L, the diode D*a* is blocked, too. It is now necessary to secure that the conductive transistors T*ab*, and T*ba* remain conductive during the signal exchange. This can be achieved in a simple way through a separate feed back path.

Still, it must be mentioned that the afore-described examples should not be considered as a limitation of the protective right. For example, the number of signal wires is not limited, as indicated by the transistors T*a* and T*b*, as well as the relays X*a*, X*b*, Y*a*, Y*b*, closed circuit current as well as open circuit current can be used for signalling.

The operation of this invention, as embodied in the disclosure of FIG. 1, may be briefly summarized as follows. Assume first of all that there is a transmitting device at A, a receiving device at B, and a switching grid at KF for interconnecting A and B. In a particular embodiment, A may form a part of a register in a telephone system, B may be a part of a marker and KF may be telephone switching means for interconnecting A and B.

The function of these elements in this invention, as previously described, is to provide testing means to determine positively that connections are completed between the transmitter A and the receiver B before the release of any intelligible signals.

Assume the conditions indicated in FIG. 1, with the relay contacts open, transistor T*b* conducting, transistor T*ab* "OFF" and elements A and B ready to be connected through contacts *d*, and a checking or testing potential +U2 applied to each signalling wire 1, 2 and 3 in the transmitter A. This testing potential is of a magnitude such that when it is applied over respective resistor-diode circuits R1*a*–D*a*, R1*a'*–D*a'*, R1*a''*–D*a''* (forming part of an AND gate) and the potential —U1 is applied over resistor R3*a* that the bias on the base of the transistor T*ab* holds it in a non-conductive state. With T*ab* non-conductive, the relay CG is inoperative and the contact *cg*2 is held open. Since contact *cg*2 is open, the signal transmitting contacts *sa*1, *sa*2 and *sa*3 may be closed, by components which are not illustrated, to their signal transmit positions, without transferring intelligence to B. At this time transistor T*b* is conductive as indicated in the figure, and the receive relays X*b* and Y*b* are inoperative due to the high resistance of the supply resistors in A.

As soon as a signal wire 1, 2 or 3 is through-connected over a contact *d*, the particular diode D*a*, D*a'* or D*a''* connected thereto becomes non-conductive. So long as one of the diodes D*a*, D*a'* or D*a''* remains conductive, the transistor T*ab* will be held in a non-conductive state. When all of the signal wires are connected between A and B through contacts *d*, the counter-potential —U1 will be applied to all the diodes, rendering all the diodes non-conductive. The potential —U1 will then provide a bias to the base of transistor T*ab*, causing T*ab* to conduct. Conduction by T*ab*, in turn, will cause the relay CG to operate, closing the contact *cg*2 and applying ground potential over the contacts *sa*1, *sa*2 and *sa*3 to the receiver B. At this time, the intelligence represented by the closure of any of the contacts *sa*1, *sa*2 and/or *sa*3 will be transmitted to B.

The same principles of operation may be extended to FIG. 2 which illustrates an embodiment of the invention for two-way testing of interconnection between systems.

While the principles of the invention have been described above in connection with specific apparatus and applications, it is to be understood that this description is made only by way of example and not as a limitation on the scope of the invention.

What is claimed is:

1. A system for testing the availability of a centrally controlled transmission facility for communications signals, comprising:

- a plurality of signal transmission channels having transmitting and receiving ends,
- means at said transmitting ends for receiving testing potentials on each channel,
- means at said receiving ends for receiving counter potentials on each channel, and
- an AND gate connected to each of said transmission channels,
- said AND gate determining when the system is available for transmission of communication signals by responding when said testing potentials and said counter potentials are received simultaneously from both ends of all the channels.

2. A system as claimed in claim 1, in which switching means are included, and said AND gate, after determining the availability of the system, enables said switching means to complete connections permitting the transmission of desired communication signals over the system from the transmission to the receiving ends.

3. A system substantially as claimed in claim 1, including similar facilities connected to provide transmission in opposite directions, said similar facilities including a signal channel and a second AND gate to determine when connections are complete in said opposite direction.

4. A system substantially as claimed in claim 1, in which timing circuits are connected responsive to the status of said AND gate, and said timing circuits render a fault report if after a predetermined time said AND gate continues indicating a failure to complete a successful connection.

5. A system substantially as claimed in claim 1, in which the testing potentials are supplied through large resistances which reduce the potentials received by the receiving facilities so that they are not excited by the receipt of testing potentials.

6. A system substantially as claimed in claim 5, in which resistors over which the testing potentials are received are formed as voltage dividers, and the AND circuits are connected to the voltage dividers to effectively make a comparison between the potentials.

References Cited

UNITED STATES PATENTS

| | | | |
|---|---|---|---|
| 2,978,641 | 4/1961 | Voegtlen | 179—18 |
| 3,210,478 | 10/1965 | Klees et al. | 179—18 |

KATHLEEN H. CLAFFY, *Primary Examiner.*

LAURENCE A. WRIGHT, *Assistant Examiner.*